FAULT LOCATION SYSTEM
Filed Nov. 16, 1959
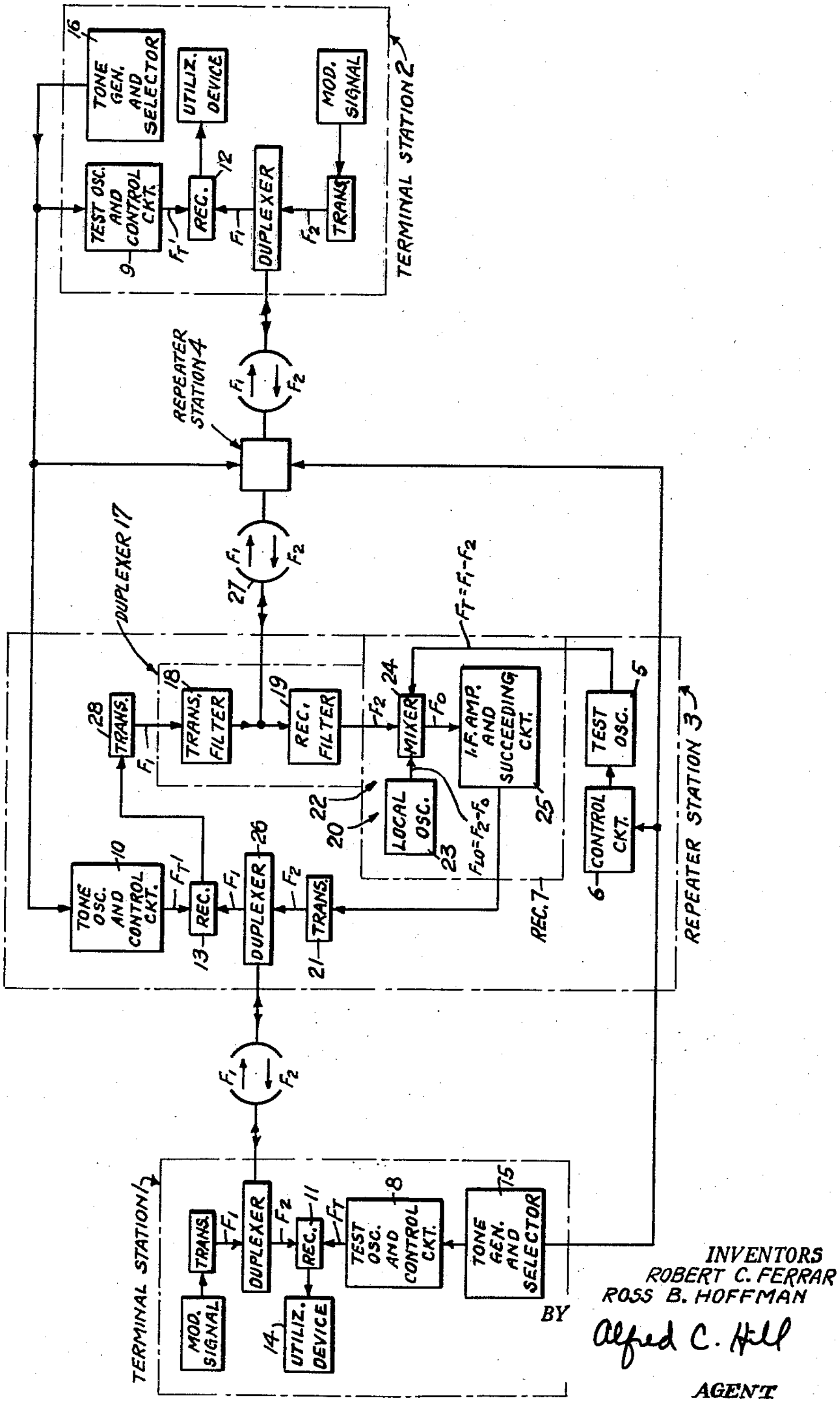
INVENTORS
ROBERT C. FERRAR
ROSS B. HOFFMAN
BY Alfred C. Hill
AGENT 3,045,113

FAULT LOCATION SYSTEM

Robert C. Ferrar, Glen Ridge, and Ross B. Hoffman, Highlands, N.J., assignors to International Telephone and Telegraph Corporation, Nutley, N.J., a corporation of Maryland Filed Nov. 16, 1959, Ser. No. 3,703
20 Claims. (Cl. 325—2)

This invention relates to communication systems and more particularly to a communication system having means to rapidly localize equipment that has failed in said communication system.

A problem in communication systems including both line-of-sight types or over-the-horizon types is to be able to define which component of the system has failed in order to allow either rapid automatic change to standby equipment or to rapidly localize the fault to a particular station. A major obstacle has been the inability in a communication system containing a transmitter and a receiver to define which of these components has failed.

One prior art fault locating system follows the following technique. Upon the failure of receiving a signal at the receiver, the switching of regular equipment to the standby equipment is delayed after a receiver output loss for about fifteen seconds in order to allow the transmitter at the adjacent station to switch from regular equipment to standby equipment. If there is still no signal after this interval, the receiver switches to standby equipment. If a signal is then received, the standby equipment would remain in service and it would be known that the regular receiver equipment had failed. If no signal were received, the regular receiver equipment is returned to service and remains in an operative condition until service is restored and then another failure occurs. The switching back to the regular equipment in the receiver would indicate that the transmitter had failed and that the switching equipment had failed to transfer the transmitter to standby equipment. The weaknesses and disadvantages of this system are (1) long switchover time due to receiver delay, (2) the possibility of standby or switching failure creating another fault, and (3) the possibility of switching to standby being unnecessary if return to service of distant station coincided with standby receiver sampling.

Another prior art fault locating system particularly useful for two-way communication systems includes a crystal mixer disposed between the transmitter output and receiver input with sufficient decoupling to reduce the transmitter level at the receiver to a value about that normally received. An oscillator is provided having a signal at a frequency equal to the difference between the transmitter and receiver carriers frequencies which is injected into the added crystal mixer to thereby coact with the transmitter signal to simulate the receipt of a signal from the distant transmitter. Through this method it can be determined by a process of elimination whether the receiver or transmitter in the communication link has failed. If the simulated signal passes through the receiver to its output then there is good reason to believe that the receiver is operating and that the distant transmitter has failed. If the receiver does not pass the simulated signal to its output there is then good reason to believe that the receiver has failed. While this arrangement eliminates the three disadvantages above outlined there is required the addition of transmission lines, decoupling means, mixer cavities and mixer crystals to provide the simulated signal at the receiver input.

Therefore, an object of this invention is to provide an improved fault location system for employment with communication systems overcoming the above-mentioned disadvantages of the prior art fault location systems.

Another object of this invention is to provide a fault location system which overcomes the disadvantages of the first-mentioned prior art fault location system utilizing a greatly reduced amount of additional equipment in comparison to that employed in the second-mentioned prior art fault location system.

A feature of this invention is the provision of a source of signals having a given frequency coupled to a frequency converting means of a receiver in the absence of an output signal from the receiver to simulate a signal having the normal output frequency of the frequency converting means to determine the operating condition of the receiver.

Another feature of this invention is the provision of a station including a transmitter and a receiver coupled by means of a duplexer to a single antenna and an oscillator generating an output signal having a frequency equal to the difference between the transmit and receive carrier frequencies and a means to couple the output signal of the oscillator to the heterodyning means included in said receiver in the absence of output signals from said receiver to simulate in conjunction with the leakage of the output signal of said transmitter through said duplexer a signal having the normal intermediate frequency at the output of said heterodyning means to thereby provide an indication of whether said receiver or the transmitter of an adjacent station include the faulty equipment by whether or not said simulated signal produces a receiver output.

Still another feature of this invention is the provision of an arrangement, as outlined above, in each station of a multistation communication system and a remote control selective system operated from one station whereby the oscillators are sequentially controlled to inject their output signal into the heterodyning means of their associated receiver proceeding sequentially from said one station until such time that the simulated signal in the communication system is not returned to the receiver of said one station thereby indicating the station that contained the faulty equipment.

The above-mentioned and other features and objects of this invention and the manner of obtaining them will become more apparent by reference to the following description taken in conjunction with the accompanying drawing, the single FIGURE of which illustrates a schematic diagram in block form of a fault location system following the principles of this invention.

Referring to the FIGURE, there is illustrated therein a communication system employing the fault location system of this invention. The communication system is illustrated as including terminal station 1, terminal station 2 and a plurality of repeater stations 3 and 4 disposed intermediate terminal station 1 and terminal station 2. Although only two repeater stations are illustrated the communication path between terminal stations 1 and 2 may include any necessary number of repeater stations. The communication system illustrated is a two-way communication system of the line-of-sight type with intelligence being transmitted on a carrier frequency $F_1$ from terminal station 1 to terminal station 2 and with intelligence being transmitted on a carrier frequency $F_2$ from terminal station 2 to terminal station 1.

While the fault location system of this invention is illustrated in conjunction with a line-of-sight type communication system, it is to be understood that the techniques taught herein can be employed also with over-the-horizon type communication systems.

The additional components and their cooperative relationship with certain of the regular components of a communication system to provide the improved fault location system of this invention are illustrated in detail in repeater station 3 in connection with receiver 7 and terminal station 1. Briefly and in general terms the additional components include a test oscillator generating a signal having a given frequency and a control circuit coupled thereto to control the coupling of the output signal from the test oscillator to the receiver with which these components are associated, namely, the receivers of each station. In accordance with the detail of station 3, test oscillator 5 and control circuit 6 are associated with receiver 7. Similar components identified in the drawing as test oscillator and control circuits 8, 9 and 10 are illustrated to be, respectively, associated with receiver 11 of station 1, receiver 12 of station 2 and receiver 13 of station 3. Although repeater station 4 is not shown in any detail whatsoever it is to be understood that repeater station 4 will include substantially the same equipment as that included in repeater station 3.

The control circuits, such as control circuits 6, may be operated at its associated station by an operator to couple the output of the test oscillator, such as oscillator 5, to their associated receiver, such as receiver 7, upon loss of output signals from the associated receiver to determine whether the receiver 7 has failed or the transmitter from which receiver 7 receives its signal has failed. Since there may be a number of repeater stations, such as repeater stations 3 and 4, and these stations may be unattended, some means must be provided to enable an operator at a terminal station to localize the equipment that has failed in a particular direction of communication on the communication path. This may be accomplished by resorting to remote control techniques wherein it is possible for an operator at say terminal station 1 to sequentially activate the control circuits associated with the receivers in the direction of communication being received at this terminal station. Hence, if there is no output in utilization device 14 of receiver 11, an operator would activate a tone generator and selector 15 to cause appropriate tone signals to be coupled via transmission lines, such as telephone lines, to the control circuits of each receiver in this particular direction of communication. For instance, the operator would activate test oscillator 8 by depressing a button in tone generator and selector 15 so designated to activate test oscillator 8. If simulated signals are recognized in utilization means 14, the operator then knows that it is equipment succeeding receiver 11, going from terminal 1 to terminal 2, which has failed and he, therefore, presses the appropriate button to activate the test oscillator in the next adjacent station, such as test oscillator 5 in station 3. Recognition of the simulated signals at utilization means 14 indicates that the failed equipment is further along this communication path toward terminal 2. This sequential energization of the control circuits associated with succeeding repeater stations enables the operator to determine which of the stations includes the faulty equipment since there will be no simulated signal output at device 14 when the test oscillator has been energized in the station where the faulty equipment is located. Having now localized the fault, it is possible to quickly switch the transmitter and receiver sequentially to standby equipment to determine which of the equipments had failed and to reinstate communication in this particular direction of communication, namely, from terminal 2 to terminal 1 in the present illustration. Localization of faulty equipment may be accomplished as described above for the direction of communication from terminal station 1 to terminal station 2 by employing tone generator and selector 16 and test oscillators and control circuits 9 and 10. The control circuit, such as control circuit 6, may be any number of well known types of selector and/or switch circuits. In a remote control situation, circuit 6 may include a circuit tuned to a particular frequency. When the tone signal having said particular frequency is selected by the operator, the tuned circuit will respond thereto operating a switch for activation of its associated test oscillator, such as oscillator 5. With each control circuit responding to a different frequency, selective calling techniques may be employed to sequentially activate the test oscillator in each of the stations proceeding from the receiving end of a communication direction to the transmitting end thereof as described above. Control circuit 6 may be, if operated on a one-hop communication system, such as an over-the-horizon communication system, or in an attended station of a multi-station line-of-sight communication path, a manually operated switch which an operator would activate to inject the output signal of the test oscillator into the associated receiver. In either case, remote control or local control, the switch may be in the output signal lead or it may be in the power supply lead of the oscillator. In the latter situation, it would be advisable to have the filament power "on" at all times and to switch the anode power lead. This maintains the oscillator in a ready condition and eliminates the time required for warmup if the filament power were switched along with the anode power.

Having discussed the added components and a certain amount of the operation thereof, particularly with respect to the control circuits activating the test oscillators, we will now deal with the components of the regular communication system with which the added components of the fault location system of this invention cooperate. The remaining description will be directed toward repeater stations 3 wherein the detail of the regular communication system components are illustrated in a cooperative relationship with test oscillator 5 and control circuit 6.

The regular communication system equipment necessary for the operation of this fault location system is a duplexer 17 including a transmit filter 18 and a receive filter 19 and a frequency converting means 20 to convert the received carrier frequency, such as $F_2$, in the communication direction from terminal station 2 to terminal station 1 to have another frequency which will enable the receiver to have an output signal, either for energization of an intelligence recovering device or for coupling to the transmitter of the repeater station, such as transmitter 21 of repeater station 3. This frequency converting means could be a parametric amplifier wherein the received signal at $F_2$ is raised in frequency and amplitude to provide a signal output having a predetermined frequency which may then be operated upon by succeeding circuitry to produce a useful output signal from the receiver 7. It will then be necessary for test oscillator 5 to produce a signal having a given frequency which through cooperation with frequency converting means 20 simulates the output of the parametric amplifier thereby enabling a testing of the components and equipment in the repeater or terminal station in accordance with the principles of this invention. For purposes of explanation, however, the operation of the fault location system of this invention is described utilizing a heterodyning means 22 as frequency converting means 20. Means 22 includes local oscillator 23 and mixer 24. The resultant output of mixer 24 is the usual IF (intermediate frequency) signal produced in a superheterodyne receiver which is lower than the received carrier frequency. The resultant output of the mixer, the IF signal, is coupled to an IF amplifier and succeeding circuitry 25 with the output thereof being coupled to transmitter 21 for application to duplexer 26 and hence, reception at terminal station 1 for application to receiver 11 for utilization in device 14.

It should be pointed out that in repeater stations, such as repeater station 3, the signal at the output of receivers therein, such as receivers 7 and 13 may be coupled to the transmitter associated with that particular communication direction at an IF frequency or an audio frequency depending upon the operation of the repeater. The frequency at which the signal is coupled from, say receiver 7 to transmitter 21 does not play a role in the fault location system of this invention. All that is necessary is that a useful output be provided at the output of the receivers if they are operating. This useful output could be either at an IF level or an audio level depending upon whether they are in a repeater station or a terminal station and whether in the repeater station the signals are coupled at an IF or audio level to the succeeding transmitter in the communication direction.

For a more complete understanding of the operation of the fault location system of this invention the following discussion is presented with reference to the communication direction on the communication path from terminal station 2 to terminal station 1 and with particular reference to the detail circuitry shown in repeater station 3 in connection with receiver 7. During normal operation a signal having a frequency $F_2$ is received on antenna 27 from repeater station 4 and is coupled by means of receiving filter 19 of duplexer 17 to mixer 24. The output signal of local oscillator 23 having a frequency equal to $F_{L0}=F_2-F_0$ is also coupled to mixer 24. The frequency of the resultant output signal of mixer 24 is an intermediate frequency, $F_0$.

Let us assume that the transmitter transmitting to receiver 7 has failed. This failure of course results in no output signal from receiver 7 and utilization device 14. Under this condition the frequency of the output signal of mixer 24 will be $F_1-F_{L0}=(F_1-F_2)+F_0$. The frequency $F_1$ enters into the signal output of mixer 24 in the absence of signal $F_2$ at antenna 27, since it is well known there is a certain amount of leakage through duplexer 17 from transmitter 28 to mixer 24. With this output upon the failure of receiving signal $F_2$ at antenna 27, the IF amplifier at succeeding circuitry 25 will not be able to function since the output frequency of mixer 24 is not proper, namely the output frequency of mixer 24 is not $F_0$. This loss of signal at antenna 27 would of course be reflected by a lack of output from receiver 7 in the case of only a single hop communication system and also in the case of a multi-hop communication system no signal output would be present at utilization device 14. The loss of signal would indicate to an operator to activate the control circuit 6, either by remote operation through tone generator and selector 15, or by a local operation, if it is an attended station, to cause the injection of the output signal of test oscillator 5 into mixer 24. With the presence of leakage of frequency $F_1$ through duplexer 17 from transmitter 28, the output signal of test oscillator 5, indicated as $F_T$ is equal to $(F_1-F_2)$, a frequency equal to the difference between the carrier frequencies of the signals traveling in opposite directions on the communication path between terminals 1 and 2. It is to be remembered, however, that the frequency of the signal at the output of test oscillator 5 would be adjusted to meet the conditions present in the receiver. Hence, if there were no leakage of the signal transmitted by transmitter 28, the frequency of the signal at the output of test oscillator 5 would have to be changed with respect to the frequency of the signal output of the local oscillator 23. With or without signal leakage from transmitter 28, the output signal would have to be adjusted in frequency to produce the desired output signal from frequency converting means 20 to cause a simulated output signal from receiver 7 with the loss of signal at frequency $F_2$, if a parametric amplifier were utilized as frequency converting means 20.

Upon energization of test oscillator 5 through the operation of control circuit 6, the output signal of test oscillator 5 at a frequency $F_T$ is coupled to mixer 24. When this signal is mixed with the output of local oscillator 23 and the signal leaking through duplexer 17 from transmitter 28, there results at the output of mixer 24 a simulated signal at a frequency $F_0$. This simulated signal at the output of mixer 24 upon failure of receiving energy on antenna 27 is produced by the following frequencies:

$$F_1-F_{L0}-F_T=F_1-F_{L0}-(F_1-F_2)$$
$$=F_2-F_{L0}=F_2-F_2+F_0=F_0$$

Thus, through the cooperation of the signal generated in oscillator 5, the leaking signal from transmitter 28 and the output of local oscillator 23, it is possible to produce at the output of mixer 24 a simulated intermediate frequency $F_0$ which will produce a simulated signal at the output of receiver 7 and hence, through the remainder of the communication system to the receiver 11 included in terminal station 1 if the intervening components of the communication direction are in operation.

It can then be stated that upon failure in a communication hop including at least a receiver and transmitter the energization of the test oscillator will provide a simulated intermediate frequency signal at the output of the heterodyning means for coupling to the output of the receiver, if the receiver is operating. Hence, if a simulated signal appears at the output of the receiver this is an indication that the receiver equipment has not failed and that actually the transmitter equipment has failed.

Utilizing a similar approach and remote control techniques to control the operation of the test oscillator it would be possible to localize the station in a multi-station communication system that contained the equipment that caused loss of communication. The technique is as follows: Assume no output from utilization device 14 which indicates a failure has occurred in the communication direction from terminal station 2 to terminal station 1. The operator energizes the appropriate tone for coupling from generator 15 to test oscillator 8 of terminal station 1. Assume that a simulated output signal appears in utilization device 14. It is true that this may be a very weak signal but it will be one which the operator will be able to observe. The output from receiver 11 indicates that receiver 11 is operating and that it is equipment succeeding receiver 11 traveling from the terminal station 1 to the terminal station 2, the direction in which the stations are sequentially tested by remote control from tone generator and selector 15. Having received output from receiver 11 the operator would next energize the test oscillator 5 of repeater station 3 to determine whether a simulated output is now received at receiver 11. Assuming that an output is received at receiver 11 when test oscillator 5 is energized, the operator then knows that repeater station 3 is operable and that the faulty equipment is not contained in this repeater station. The operator will then next energize the test oscillator contained in repeater station 4. Assume that there is no signal received at receiver 11. This would indicate to the operator that repeater station 4 contains the faulty equipment. Action would then be taken to quickly switch the equipment of repeater station 4 sequentially to standby equipment to place this communication direction back into operation. The transmitter could be switched to standby equipment and if service was restored, it is certain that the transmitter was at fault. If, however, service was not restored, the probability that the receiver is at fault is very high. The receiver is then switched to standby and service will more than likely be restored.

Hereinabove we have described the techniques of fault location employing the components of this invention in addition to the regular communication system components with respect to the communication direction between terminal station 2 and terminal station 1. A similar arrangement and procedure may be employed in conjunction with the test oscillator and control circuits 9 and 10 and tone generator and selector 16 for remote control in the communication direction from terminal station 1 to terminal station 2.

It can be shown for the communication direction from terminal 1 to terminal 2 that upon normal operation the frequency of the output signal of the receiver mixer is $F_0' = F_1 - F_{L0}'$. Upon failure of a transmitter transmitting signals to the receiver, the output signal of the receiver mixer, such as in receiver 13, would have a frequency equal to $F_2 - F_{L0}' = F_2 - F_1 + F_0'$. When the test oscillator is turned on either by a local activation thereof or by remote control selection and activation thereof from tone generator 16, the output signal therefrom at a frequency $F_T' = F_2 - F_1$ produces at the output of the receiver mixer the normal output $F_0'$ which is obtained by heterodyning the following frequency signal:

$$F_2 - F_{L0}' - (F_2 - F_1) = F_1 - F_{L0}' = F_2 - F_1 + F_0' = F_0'$$

The system above described for localizing a particular component of a communication system including a single transmitter and a receiver which has failed, or localizing a particular station that includes the failed equipment has the advantage over the first mentioned prior art arrangement in that it is rapid and positive in operation similar to the second mentioned prior art arrangement. The present invention has an improvement over the second mentioned prior art arrangement in that only the addition of a simple test oscillator and an arrangement to inject the output of the test oscillator into the frequency converting or heterodyning arrangement of the receiver is necessary. This is in contrast to the second mentioned prior art arrangement which required transmission lines and decoupling means for connecting the added mixer cavity and mixer crystal between the transmitter and receiver operating in opposite communication directions, for instance between transmitter 28 and receiver 7, as well as a test oscillator to enable the simulation of a signal at the input of the receiver equal in frequency to the usual received carrier frequency. The system of this invention has an advantage over the prior art arrangements in that the equipment added to the regular communication system equipment is relatively inexpensive as compared with the added equipment of the prior art arrangements.

While we have described above the principles of our invention in connection with specific apparatus, it is to be clearly understood that this description is made by way of example and not as a limitation to the scope of our invention as set forth in the objects thereof and in the accompanying claims.

We claim:

1. A fault locating system for communication systems comprising a receiver for receiving a signal having a given carrier frequency from a distant transmitter, said receiver including a means to convert the signal having said given carrier frequency to a signal having a predetermined frequency to provide an output signal from said receiver when said receiver is operating and a source of signals having a given frequency coupled to said converting means in the absence of said output signal to simulate at the output of said converting means a signal having said predetermined frequency to determine the operating condition of said receiver.

2. A fault locating system for communication systems comprising a receiver for receiving a signal having a given carrier frequency from a distant transmitter, said receiver including a heterodyning means to convert the signal having said given carrier frequency to a signal having a given intermediate frequency to provide an output signal from said receiver when said receiver is operating and a source of signals having a given frequency coupled to said heterodyning means in the absence of said output signal to simulate at the output of said heterodyning means a signal having said intermediate frequency to determine the condition of said receiver.

3. A fault locating system for communication systems comprising a receiver for receiving a signal having a given frequency from a distant transmitter, said receiver including a heterodyning means to convert the signal having said given carrier frequency to a signal having a given intermediate frequency to provide an output signal from said receiver when said receiver is operating, a source of signals having a given frequency associated with said heterodyning means, and controllable means to inject the signal of said source of signals into said heterodyning means in the absence of said output signal to simulate at the output of said heterodyning means a signal having said intermediate frequency to determine the operating condition of said receiver.

4. A fault locating system for communication systems comprising a plurality of transmitters and receivers alternately arranged in tandem to provide a continuous communication path for communication by a signal at a given carrier frequency, each of said receivers including a heterodyning means to convert the signal having said given carrier frequency to a signal having a given intermediate frequency to provide an output signal from its associated one of said receivers when said associated receiver is operating, a source of signals having a given frequency associated with each of said heterodyning means, and controllable means to inject the signals of said source of signals into its associated one of said heterodyning means in the absence of said output signal from said associated receiver to simulate at the output of said heterodyning means a signal having said intermediate frequency to determine the operating condition of said associated receiver.

5. A fault locating system for communication systems comprising a terminal station at each end of a communication path, a plurality of repeater stations disposed intermediate said terminal stations, each of said repeater stations include both a transmitter and receiver, one of said terminal stations includes a receiver and the other of said terminal station includes a transmitter to cooperate in providing communication by a signal at a given carrier frequency, each of said receivers including a heterodyning means to convert the signal of said given carrier frequency to a signal having a given intermediate frequency to provide an output signal from its associated one of said receivers when said associated receiver is operating, a source of signals having a given frequency associated with each of said heterodyning means, and controllable means coupled to each of said source of signals selectively operated from said one terminal to sequentially inject the signals of each of said sources of signals into their associated one of said heterodyning means in the absence of output signal from the receiver of said one terminal to simulate at the output of said heterodyning means associated with said selected source of signals a signal having said intermediate frequency to sequentially determine the operating condition of each of said receivers until the fault is localized to a particular station.

6. A fault locating system for communication systems comprising a station including a transmitter for transmitting a signal to a distant receiver at a first frequency, a receiver for receiving a signal from a distant transmitter at a second frequency, an antenna, means coupling said antenna to said transmitter and said receiver, said receiver including a means to convert the signal at said second frequency to a signal having a predetermined frequency to provide an output signal from said receiver when said receiver is operating, and an oscillator generating an output signal having a given frequency coupled to said converting means in the absence of said output signal to simulate in conjunction with the leakage of signal of said first frequency through said antenna coupling means into said converting means a signal having said predetermined frequency to determine the operating condition of said receiver.

7. A fault locating system for communication systems comprising a station including a transmitter for transmitting a signal to a distant receiver at a first frequency, a receiver for receiving a signal from a distant transmitter at a second frequency, an antenna, means coupling said antenna to said transmitter and said receiver, said receiver including a heterodyning means to convert the signal at said second frequency to a signal having a given intermediate frequency to provide an output signal from said receiver when said receiver is operating, and an oscillator generating an output signal having a given frequency coupled to said heterodyning means in the absence of said output signal to simulate in conjunction with the leakage of signal of said first frequency through said antenna coupling means into said heterodyning means a signal having said intermediate frequency to determine the operating condition of said receiver.

8. A fault locating system for communication systems comprising a station including a transmitter for transmitting a signal to a distant receiver at a first frequency, a receiver for receiving a signal from a distant transmitter at a second frequency, an antenna, means coupling said antenna to said transmitter and said receiver, said receiver including a heterodyning means to convert the signal at said second frequency to a signal having a given intermediate frequency to provide an output signal from said receiver when said receiver is operating, and an oscillator generating an output signal having a frequency equal to the difference between said first and second frequencies coupled to said heterodyning means in the absence of said output signal to simulate in conjunction with the leakage of signal of said first frequency through said antenna coupling means into said heterodyning means a signal having said intermediate frequency to determine the operating condition of said receiver.

9. A fault locating system for communication systems comprising a station including a transmitter for transmitting a signal to a distant receiver at a first frequency, a receiver for receiving a signal from a distant transmitter at a second frequency, an antenna, a duplexer coupling said antenna to said transmitter and said receiver, said receiver including a heterodyning means to convert the signal at said second frequency to a signal having a given intermediate frequency to provide an output signal from said receiver when said receiver is operating, and an oscillator generating an output signal having a frequency equal to the difference between said first and second frequencies coupled to said heterodyning means in the absence of said output signal to simulate in conjunction with the leakage of signal of said first frequency through said duplexer into said heterodyning means a signal having said intermediate frequency to determine the operating condition of said receiver.

10. A fault locating system for communication systems comprising a station including a transmitter for transmitting a signal to a distant receiver at a first frequency, a receiver for receiving a signal from a distant transmitter at a second frequency, an antenna, means coupling said antenna to said transmitter and said receiver, said receiver including means to convert the signal at said second frequency to a signal having a predetermined frequency to provide an output signal from said receiver when said receiver is operating, an oscillator generating an output signal having a given frequency associated with said converting means, and controllable means to inject the output signal of said oscillator into said converting means in the absence of said output signal to simulate in conjunction with the leakage of signal of said first frequency through said antenna coupling means into said heterodyning means a signal having said predetermined frequency to determine the operating condition of said receiver.

11. A fault locating system for communication systems comprising a station including a transmitter for transmitting a signal to a distant receiver at a first frequency, a receiver for receiving a signal from a distant transmitter at a second frequency, an antenna, means coupling said antenna to said transmitter and receiver, said receiver including a heterodyning means to convert the signal at said second frequency to a signal having a given intermediate frequency to provide an output signal from said receiver when said receiver is operating, an oscillator generating an output signal having a given frequency associated with said heterodyning means, and controllable means to inject the output signal of said oscillator into said heterodyning means in the absence of said output signal to simulate in conjunction with the leakage of signal of said first frequency through said antenna coupling means into said heterodyning means a signal having said intermediate frequency to determine the operating condition of said receiver.

12. A fault locating system for communication systems comprising a station including a transmitter for transmitting a signal to a distant receiver at a first frequency, a receiver for receiving a signal from a distant transmitter at a second frequency, an antenna, means coupling said antenna to said transmitter and said receiver, said receiver including a heterodyning means to convert the signal at said second frequency to a signal having a given intermediate frequency to provide an output signal from said receiver when said receiver is operating, an oscillator generating an output signal having a frequency equal to the difference between said first and second frequencies associated with said heterodyning means, and controllable means to inject the output signal of said oscillator into said heterodyning means in the absence of said output signal to simulate in conjunction with the leakage of signal of said first frequency through said antenna coupling means into said heterodyning means a signal having said intermediate frequency to determine the operating condition of said receiver.

13. A fault locating system for communication systems comprising a station including a transmitter for transmitting a signal to a distant receiver at a first frequency, a receiver for receiving a signal from a distant transmitter at a second frequency, an antenna, a duplexer coupling said antenna to said transmitter and said receiver, said receiver including a heterodyning means to convert the signal at said second frequency to a signal having a given intermediate frequency to provide an output signal from said receiver when said receiver is operating, an oscillator generating an output signal having a frequency equal to the difference between said first and second frequencies associated with said heterodyning means and controllable means to inject the output signal of said oscillator into said heterodyning means in the absence of said output signal to simulate in conjunction with the leakage of signal of said first frequency through said duplexer into said heterodyning means a signal having said intermediate frequency to determine the operating condition of said receiver.

14. A fault locating system for communication systems comprising a terminal station at each end of a communication path; a plurality of repeater stations disposed intermediate said terminal stations; each of said repeater stations including a first transmitter and a first receiver cooperating to provide communication by a first signal at a first frequency in a first direction on said communication path, a second transmitter and a second receiver cooperating to provide communication by a second signal at a second frequency in a second direction opposite to said first direction on said communication path, a first and a second antenna, a first means coupling said first antenna to said first receiver and said second transmitter, and a second means coupling said second antenna to said second receiver and said first transmitter; one of said terminal stations including a third transmitter for transmitting said first signal, a third receiver for receiving said second signal, a third antenna, and a third means coupling said third antenna to said third transmitter and said third receiver; the other of said terminal stations including a fourth transmitter for transmitting said second signal, a fourth receiver for receiving said first signal, a fourth antenna, and a fourth means coupling said fourth antenna to said fourth transmitter and said fourth receiver; a heterodyning means included in each of said receivers to convert the signal received by its associated receiver to a signal having a given intermediate frequency to provide an output signal from said associated receiver when said associated receiver is operating; an oscillator having an output signal at a first given frequency associated with each of said receivers of said first direction; an oscillator having an output signal at a second given frequency associated with each of said receivers of said second direction; control means coupled to each of said oscillators; controllable means to sequentially activate said control means of said oscillators associated with said first and fourth receivers to inject said oscillator output signal into said heterodyning means included in said first and fourth receivers in the absence of output signal from said fourth receiver, said injected oscillator output signal in conjunction with the leakage signal from said second and fourth transmitters passing through said first and fourth antenna coupling means simulating at the output of said heterodyning means of said first and fourth receivers a signal at said intermediate frequency to sequentially determine the operating conditions of said first and fourth receivers to localize the failed equipment in said first direction; and controllable means to sequentially activate said control means of said oscillators associated with said second and third receivers to inject said oscillator output signal into said heterodyning means included in said second and third receivers in the absence of output signal from said third receiver, said injected oscillator output signal in conjunction with the leakage signal from said first and third transmitters passing through said second and third antenna coupling means simulating at the output of said heterodyning means of said second and third receiver a signal at said intermediate frequency to sequentially determine the operating conditions of said second and third receivers to localize the failed equipment in said second direction.

15. A fault locating system for communicaion systems comprising a terminal station at each end of a communication path; a plurality of repeater stations disposed intermediate said terminal stations; each of said repeater stations including a first transmitter and a first receiver cooperating to provide communication by a first signal at a first frequency in a first direction on said communication path, a second transmitter and a second receiver cooperating to provide communication by a second signal at a second frequency in a second direction opposite to said first direction on said communication path, a first and a second antenna, a first means coupling said first antenna to said first receiver and said second transmitter, and a second means coupling said second antenna to said second receiver and said first transmitter; one of said terminal stations including a third transmitter for transmitting said first signal, a third receiver for receiving said second signal, a third antenna, and a third means coupling said third antenna to said third transmitter and said third receiver; the other of said terminal stations including a fourth transmitter for transmitting said second signal, a fourth receiver for receiving said first signal, a fourth antenna, and a fourth means coupling said fourth antenna to said fourth transmitter and said fourth receiver; a heterodyning means included in each of said receivers to convert the signal received by its associated receiver to a signal having a given intermediate frequency to provide an output signal from said associated receiver when said associated receiver is operating; an oscillator having an output signal at a frequency equal to the difference of said first and second frequencies associated with each of said receivers of said first direction; an oscillator having an output signal at a frequency equal to the difference of said first and second frequencies associated with each of said receivers of said second direction; a control means coupled to each of said oscillators; controllable means to sequentially activate said control means of said oscillators associated with said first and fourth receivers to inject said oscillator output signal into said heterodyning means included in said first and fourth receivers in the absence of output signal from said fourth receiver, said injected oscillator output signal in conjunction with the leakage signal from said second and fourth transmitters passing through said first and fourth antenna coupling means simulating at the output of said heterodyning means of said first and fourth receivers a signal at said intermediate frequency to sequentially determine the operating conditions of said first and fourth receivers to localize the failed equipment in said first direction; and controllable means to sequentially activate said control means of said oscillators associated with said second and third receivers to inject said oscillator output signal into said heterodyning means included in said second and third receivers in the absence of output signal from said third receiver, said injected oscillator output signal in conjunction with the leakage signal from said first and third transmitters passing through said second and third antenna coupling means simulating at the output of said heterodyning means of said second and third receiver a signal at said intermediate frequency to sequentially determine the operating conditions of said second and third receivers to localize the failed equipment in said second direction.

16. A fault locating system for communication systems comprising a terminal station at each end of a communication path; a plurality of repeater stations disposed intermediate said terminal stations; each of said repeater stations including a first transmitter and a first receiver cooperating to provide communication by a first signal at a first frequency in a first direction on said communication path, a second transmitter and a second receiver cooperating to provide communication by a second signal at a second frequency in a second direction opposite to said first direction on said communication path, a first and a second antenna, a first duplexer coupling said first antenna to said first receiver and said second transmitter, and a second duplexer coupling said second antenna to said second receiver and said first transmitter; one of said terminal stations including a third transmitter for transmitting said first signal, a third receiver for receiving said second signal, a third antenna, and a third duplexer coupling said third antenna to said third transmitter and said third receiver; the other of said terminal stations including a fourth transmitter for transmitting said second signal, a fourth receiver for receiving said first signal, a fourth antenna, and a fourth duplexer coupling said fourth antenna to said fourth transmitter and said fourth receiver; a heterodyning means included in each of said receivers to convert the signal received by its associated receiver to a signal having a given intermediate frequency to provide an output signal from said associated receiver when said associated receiver is operating; an oscillator having an output signal at a frequency equal to the difference of said first and second frequencies assoicated with each of said receivers of said first direction; an oscillator having an output signal at a frequency equal to the difference of said first and second frequencies associated with each of said receivers of said second direction; a control means coupled to each of said oscillators; controllable means to sequentially activate said control means of said oscillators associated with said first and fourth receivers to inject said oscillator output signal into said heterodyning means included in said first and fourth receivers, said injected oscillator output signal in conjunction with the leakage signal from said second and fourth transmitters passing through said first and fourth duplexers simulating at the output of said heterodyning means of said first and fourth receivers a signal at said intermediate frequency to sequentially determine the operating conditions of said first and fourth receivers to localize the failed equipment in said first direction; and controllable means to sequentially activate said control means of said oscillators associated with said second and third receivers to inject said oscillator output signal into said heterodyning means included in said second and third receivers in the absence of output signal from said third receiver, said injected oscillator output signal in conjunction with the leakage signal from said first and third transmitters passing through said second and third duplexers simulating at the output of said heterodyning means of said second and third receiver a signal at said intermediate frequency to sequentially determine the operating conditions of said second and third receivers to localize the failed equipment in said second direction.

17. A fault locating system for obtaining an indication of the location of faulty equipment in a transmission path including a transmitter and receiver disposed in said path, said receiver including means to convert the frequency of the signal received from said transmitter to a signal having a predetermined frequency to provide an output signal from said receiver when said receiver is operating and a source of signals having a given frequency coupled to said converting means in the absence of said output signal to simulate at the output of said converting means a signal having said predetermined frequency to determine the operating condition of said receiver whereby the presence of output signal from said receiver gives an indication that said transmitter includes the faulty equipment and the absence of output signal from said receiver gives an indication that said receiver includes the faulty equipment.

18. A fault locating system for obtaining an indication of the location of faulty equipment in a transmission path including a transmitter and receiver disposed in said path, said receiver including a heterodyning means to convert the frequency of the signal received from said transmitter to a signal having a given intermediate frequency to provide an output signal from said receiver when said receiver is operating and a source of signals having a given frequency coupled to said heterodyning means in the absence of said output signal to simulate at the output of said heterodyning means a signal having said intermediate frequency to determine the operating condition of said receiver whereby the presence of output signal from said receiver gives an indication that said transmitter includes the faulty equipment and the absence of output signal from said receiver gives an indication that said receiver includes the faulty equipment.

19. A fault locating system for obtaining an indication of the location of faulty equipment in a transmission path including a transmitter and receiver disposed in said path, said receiver including a transmitter and receiver disposed in said path, said receiver including a heterodyning means to convert the frequency of the signal received from said transmitter to a signal having a given intermediate frequency to provide an output signal from said receiver when said receiver is operating, a source of signals having a given frequency associated with said heterodyning means, and controllable means to inject the signal of said source of signals into said heterodyning means in the absence of said output signal to simulate at the output of said heterodyning means a signal having said intermediate frequency to determine the operating condition of said receiver whereby the presence of output signal from said receiver gives an indication that said transmitter includes the faulty equipment and the absence of output signal from said receiver gives an indication that said receiver includes the faulty equipment.

20. A fault locating system for obtaining an indication of the location of faulty equipment in a transmission path including a plurality of transmitters and receivers alternately arranged in tandem to provide communication in said path by a signal at a predetermined frequency, each of said receivers including a heterodyning means to convert the signal at said predetermined frequency to a signal having a given intermediate frequency to provide an output signal from its associated one of said receivers when said associated receiver is operating, a source of signals having a given frequency associated with each of said heterodyning means, and controllable means to sequentially inject the signals of said source of signals into said heterodyning means of said associated receiver in the absence of output signal from the terminal one of said receivers to simulate at the output of said heterodyning means a signal having said intermediate frequency to sequentially determine the operating condition of said receivers preceding from said terminal receiver to the terminal one of said transmitters whereby the presence of output signal from said terminal receiver gives an indication that equipment succeeding said associated receiver is faulty and the absence of output signal from said terminal receiver gives an indication that said associated receiver includes faulty equipment.

References Cited in the file of this patent

UNITED STATES PATENTS

| | | |
|---|---|---|
| 2,691,065 | Thompson | Oct. 5, 1954 |
| 2,864,943 | Schultz | Dec. 15, 1958 |